Figure 1:
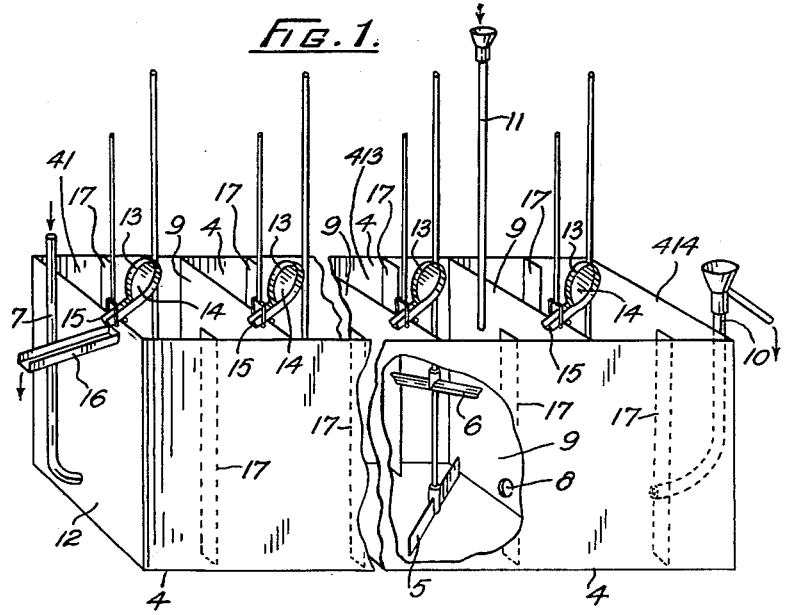

March 23, 1965  H. E. CROSS ETAL  3,174,927
ION EXCHANGE PROCESSES
Filed Sept. 1, 1959  2 Sheets-Sheet 1

INVENTORS
HARRY E. CROSS
ERNEST H. D. CARMAN
FRANK O. READ

By Kurt Kelman
AGENT

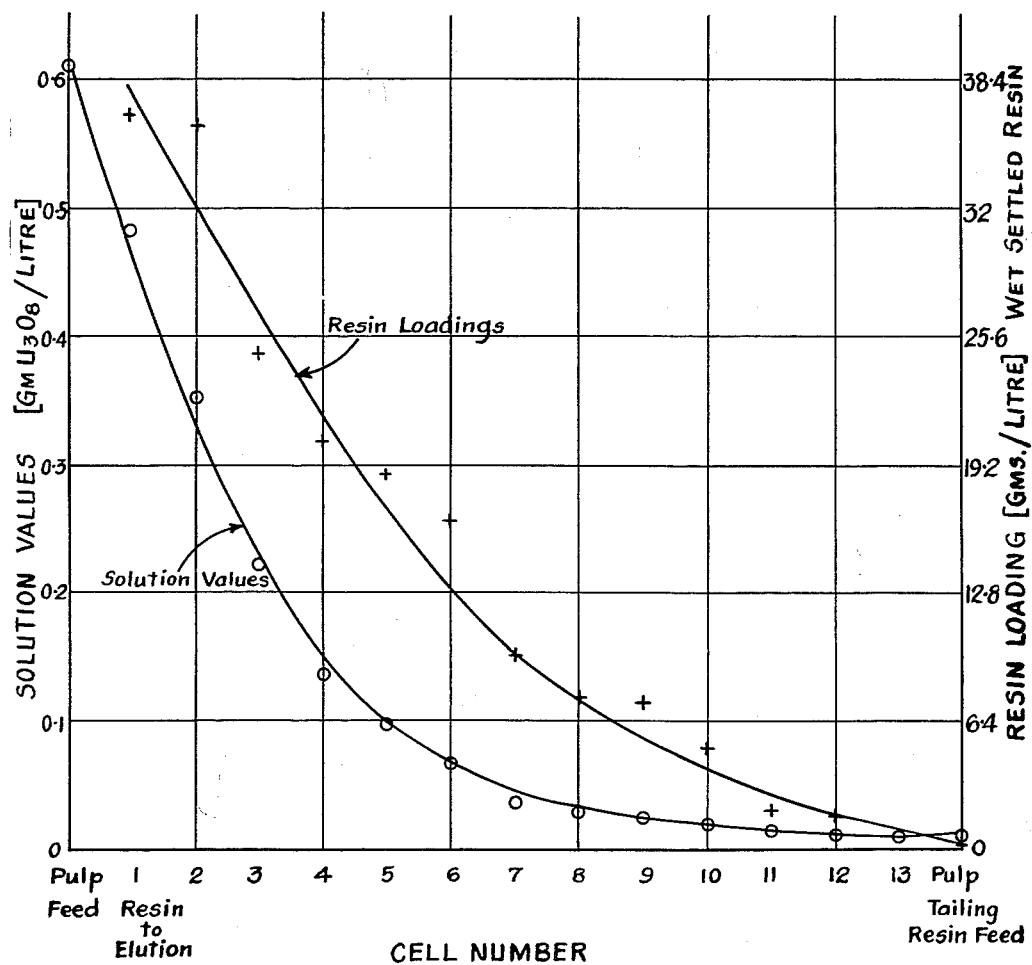

United States Patent Office 3,174,927
Patented Mar. 23, 1965

3,174,927
ION EXCHANGE PROCESSES
Harry E. Cross, 122 Albert Drive, Northcliff, Johannesburg, Transvaal, Republic of South Africa, and Ernest H. D. Carman and Frank O. Read, both of 75 Fox St., Johannesburg, Transvaal, Republic of South Africa
Filed Sept. 1, 1959, Ser. No. 13,674
Claims priority, application Republic of South Africa, Sept. 11, 1958, 3,179/58
(Filed under Rule 47(a) and 35 U.S.C. 116)
3 Claims. (Cl. 210—24)

This invention relates to ion exchange processes.

In the conventional method of recovering metals from ores by means of ion exchange processes, finely ground ore is mixed with an aqueous solution of a solvent for the metal in question, the resultant solution is separated from the solids by filtration and the filtered solution is passed through a bed of ion exchange resin to recover the metal from the solution.

Several proposals have been made by others to eliminate the need for filtration. All these proposals have this in common that the sand fraction of the pulp has to be removed and washed free of solvent, and that only pulps of very low specific gravity can be treated. Furthermore, resin losses through attrition are high.

An object of the present invention is to provide a process that can operate with a pulp in the specific gravity range of 1.4 to 1.5 without filtration or prior desanding, and at the same time to preserve the resin against attrition as much as possible.

In an ion exchange process according to the invention a layer of particulate ion exchange material is caused to float on a body of pulp and the pulp is continuously and gently agitated to keep solid particles in suspension and to provide movement of the liquid phase of the pulp between the body and the ion exchange material without significantly disturbing the layer of ion exchange material.

In the preferred form of the invention the layer of ion exchange material and the pulp are flowed in countercurrent to one another.

The ion exchange material may be in any convenient particulate form such as small rods or granular beads. The material must be sufficiently discrete or subdivided to be easily handled in slurry form. Conveniently the easily available granular form is used.

In one form of the invention the pulp is fed to the first of a series of cells which are interconnected at low levels in a predetermined sequence and the ion exchange material is fed on to the surface of one of the cells and transferred from the surface of the latter cell to the surface of another cell in the series and from that other through all the remaining cells in turn in a predetermined sequence. As said above the two sequences are preferably selected for flow to be in countercurrent.

Apparatus according to the invention comprises a container, means to introduce pulp into the container at a low level, means to withdraw pulp from the container at a low level remote from the point of introduction, means gently to agitate the contents of the container, means to deposit ion exchange material at a high level in the container and means to transfer ion exchange material from a high level in the container over the edge of a wall of the container.

In the preferred form of the invention several containers are provided in series to form cells in a single apparatus. The cells are conveniently arranged in a row for pulp to flow through apertures in partywalls separating them and for ion exchange material to be transferred over the edges of such partywalls. Preferably also the ion exchange material is transferred by scoop means adapted to move from an extreme position in which it dips into the container and another extreme position in which it discharges material scooped from the container over the wall.

Figure 2:
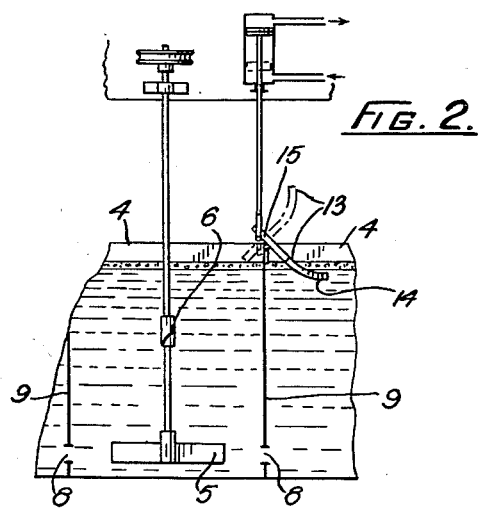

An embodiment of apparatus according to the invention is illustrated in two figures of the accompanying drawings, in which FIGURE 1 is a schematic perspective view of a series of cells, FIGURE 2 is a fragmentary section through two adjacent cells, and FIGURE 3 is a graphic illustration of the results of an example of the processes of the invention.

The apparatus shown in FIGURES 1 and 2 comprises a series of flat-bottomed square containers 4 arranged side by side. Each container defines therein a continuous cavity or cell. Each cell is comparatively deep and is provided with a paddle which in the embodiment illustrated has two blades one 5 being flat and the other or upper blade 6 being pitched.

Pulp is fed to the first cell 41 in the series from a steady head by means of an inlet pipe 7. The cells are interconnected by means of apertures 8 at low levels in the partywalls 9 between them so that pulp flows through the series of cells by being transferred through the apertures 8. The final cell 414 has an outlet pipe 10 which in the embodiment illustrated is flexible so that the outlet level may be adjusted.

Resin in slurry form is fed on the surface of the penultimate cell 413 by means of a feed pipe 11. Each cell is provided at its partywall 9 and the first cell 41 at its end wall 12 with a pivoted transfer scoop 13. Obviously the scoop may take any of a number of forms. In the embodiment illustrated the scoop is formed as a ladle having a flat-bottomed cup 14 and a handle section 15 formed as a draining channel.

Each scoop 13 is arranged to oscillate between a position in which the cup 14 dips below the level of liquid in its cell and a position in which the material collected by the cup 14 drains through the channel 15 into the adjacent cell. The scoop 13 of the first cell 41 drains into a lounder 16 which conveys the loaded resin to screening and eluting steps.

The scoops 13 may be oscillated by any suitable means such as cam mechanisms, crank mechanisms, electromagnetic devices, pneumatic devices or hydraulic devices. In FIGURE 2 a hydraulic cylinder for oscillating the scoop 13 is illustrated. The feed of hydraulic fluid to either side of the cylinder takes place by means of suitable valves of a well known kind in a suitable hydraulic system. As the hydraulic system is well known, it has not been illustrated.

The oscillating system is arranged to cause the scoop 13 to dip gently into the cell so as to disturb the ion exchange resin as little as possible. After a short period of dwell it is again gently elevated to the discharge position where a short period of dwell again takes place.

In operation pulp is fed into the first cell 41. It flows freely but slowly through the apertures 8 to the other cells. Solids are kept in suspension by the gentle agitation of the paddle blades 5 and 6. The agitation is not so violent as to disturb the surface to any significant extent. To smooth the swirl to some extent, baffle plates 17 are provided on the sides of each cell 4.

As soon as the pulp reaches a suitable operating level, which may be adjusted by adjusting the discharge level of the pipe 10, each cell excepting the last cell 414 is charged with a predetermined quantity of ion exchange resin on its surface. The scoop operating mechanism is also started and fresh resin in slurry form is run in through the pipe 11 at a predetermined rate to replenish resin removed from the cell 413 by the scoop 13.

The cell 414 is fitted with a scoop 13 which is designed to return entrained resin coming to the surface in the cell 414 to the circuit. The cell 414 thus acts as a trap.

Portions of resin are regularly withdrawn from each cell and passed to the next cell and in the cell 41 passed to other circuits.

The resin floats due to the density of the pulp which is arranged to be sufficiently higher than the density of the ion exchange resin. Normally the density of the pulp would be kept high by adjusting the concentration of the digesting solution used for treating the pulp. This causes no difficulty and in ore digesting operations is often an advantage. Where the density of a pulp is too low, suitable dewatering operations may have to be carried out, but this will rarely be necessary in practice. Solution removed by dewatering will have to be treated in a separate ion exchange circuit, or possibly returned to the leaching circuit to digest more incoming ore. The main point is that filtration is completely eliminated, and that desanding of the pulp is not necessary.

In effect then the resin and pulp flow in countercurrent through a series of cells, with the resin floating on the surface of the pulp.

In an example of the invention a pulp obtained from a typical South African uranium recovery plant was treated with an anion exchange resin to recover dissolved uranium. The details of this example are as follows:

Plant: As illustrated in FIGURES 1 and 2 and described above and consisting of thirteen cells, 41–413 and an additional trap cell 414.
Capacity per cell: 22 litres.
Depth of each cell: 46 centimetres.
Average depth of pulp in each cell: 38 centimetres.
Thickness of floating layer: Between 6.25 and 12.5 millimetres.
Average ratio of resin slurry to volume of pulp in cell: 3:100.
Speed of paddles 103 revolutions per minute.
Speed of scoops: 4 complete cycles per minute.
Rate of pulp feed to first cell: 2.2 litres per minute.
Average retention time of pulp per cell: 10 minutes.
Specific gravity of pulp: 1.46.
Specific gravity of suspended solids: 2.7.
Specific gravity of clear solutions: 1.03.
Percentage solution in pulp: 52.4.
Initial charge of resin to each of first 13 cells, per cell: 600 ml.
Feed rate of resin to cell 413: 30 ml. per minute.
Type of resin: that sold under trade name XE 198, being a strong base resin supplied by Rohm & Haas.
Average retention time of resin per cell: 20 minutes.
Average amount of resin transferred: 30 ml. per minute.
Typical grading of suspended solids:

| Tyler mesh | Nominal metric size, mm. | Percent by weight |
| --- | --- | --- |
| +60 | over 0.246 | 0.1 |
| −60+90 | 0.150 to 0.246 | 1.5 |
| −90+200 | 0.074 to 0.150 | 9.9 |
| −200+325 | 0.044 to 0.074 | 28.5 |
| −325 | less than 0.44 | 60.0 |

Analysis of solution in feed pulp:
$Fe^{++}$ _____gm. per litre__ 0.53
$Fe^{+++}$ _____do____ 2.50
$H_2SO_4$ _____do____ 4.2
$SiO_2$ _____do____ 2.5
$U_3O_8$ _____do____ 0.612
pH value _____ 1.5

Grading analysis of resin:

| Tyler mesh | Nominal metric size, mm. | Percent by weight |
| --- | --- | --- |
| +10 | over 1.651 | Nil. |
| −10+16 | 0.991 to 1.651 | 19.1 |
| −16+20 | 0.833 to 0.991 | 78.3 |
| −20+28 | 0.589 to 0.833 | 2.3 |
| −28 | less than 0.589 | 0.3 |

Procedure: Warm uranium bearing pulp was fed into the first cell of the series (i.e., cell 41) at a constant rate of 2.2 litres per minute. The degree of agitation in each cell was just sufficient to maintain the suspension of solids in the pulp while allowing the resin to float undisturbed on the surface. The paddle blades were so shaped and positioned that pulp and resin moved freely in relation to each other.

Pulp gravitated from cell to cell and finally left the circuit at cell 414. This last cell was used only to trap any resin that may have been entrained in the pulp leaving the penultimate cell. In fact very little entrainment was observed.

The scoops 13 transferred floating resin from the surface of each cell to the one adjacent in a direction opposite to the flow of pulp.

Initially the concentration of uranium on the resin and the concentration of uranium in solution in each cell were approximately in equilibrium from a previous test. After approximately 9 hours of running time resin and solution were taken from each cell as samples for analysis.

The results from the sampling are shown in the following table and graphically illustrated in FIGURE 3.

*Table*

| Cell No. | Solution $U_3O_8$, g./l. | Resin $U_3O_8$, g./l. wet settled resin | Temperature, °C. |
| --- | --- | --- | --- |
| Feed | 0.612 | | |
| 1 | 0.484 | 36.6 | 60 |
| 2 | 0.354 | 36.2 | |
| 3 | 0.222 | 24.8 | |
| 4 | 0.136 | 20.5 | |
| 5 | 0.098 | 18.9 | |
| 6 | 0.067 | 16.4 | |
| 7 | 0.039 | 9.65 | |
| 8 | 0.029 | 7.49 | |
| 9 | 0.024 | 7.38 | |
| 10 | 0.020 | 4.90 | |
| 11 | 0.013 | 1.95 | |
| 12 | 0.011 | 1.55 | |
| 13 | 0.008 | 0.61 | 40 |
| Resin Feed | | 0.11 | |

The efficiency of ion exchange was thus 98.7 percent with a resin loading of 36.6 gm. of $U_3O_8$ per litre of wet settled resin. The pulp temperature is that which is often used for leaching. As it was unnecessary either to desand or filter the pulp, no loss of $U_3O_8$ was incurred other than that shown in the above table.

We claim:

1. An ion exchange process consisting in establishing a layer of a granular ion exchange material floating on a body of pulp containing an ion to be exchanged with said ion exchange material, the specific gravity of said ion exchange material being less than that of said pulp; gently agitating the pulp, the agitation being not sufficiently violent as to disturb the upper surface of the body of pulp and the layer of granular ion exchange material thereon; and removing the ion exchange material after it has effected removal of a substantial portion of the ions to be removed from said pulp.

2. An ion exchange process for treating a pulp consisting in flowing a granulated ion exchange material having a specific gravity less than that of the pulp through a series of chambers in which the pulp is subjected to gentle agitation, the agitation being not sufficiently violent as to disturb the upper surface of the pulp in said chambers, the granulated ion exchange being flowed as a layer on said pulp, flowing countercurrent to the movement of the pulp; and including the steps of removing a portion of the ion exchange material after it has moved countercurrent to the pulp and adding said portion of ion exchange material to the next but one stage in the direction of flow of the pulp.

3. An ion exchange process consisting in a series of steps in each of which a layer of particulate ion exchange material is deposited on a body of pulp, the density of said pulp being higher than the density of ion exchange material, and the pulp is continuously and gently agitated to keep the solid particles in suspension and to provide movement of the liquid phase of the pulp between the pulp body and the ion exchange material without significantly disturbing the layer of ion exchange material, pulp being introduced into the first step of the series, transferred from the first step without disturbing the layer to the next step and so on from step to step to the last step where pulp is withdrawn, and ion exchange material being added to the layer in the last step and a portion of the layer in the last step being removed and added to the layer of the penultimate step and portions being removed from step to step in reverse sequence to the pulp flow and the portion that is removed from the first step being withdrawn from the circuit.

References Cited by the Examiner
UNITED STATES PATENTS

| | | | |
|---|---|---|---|
| 2,545,239 | 3/51 | McQuiston et al. | 210—33 X |
| 2,735,795 | 2/56 | Weiss et al. | 210—33 |
| 2,743,154 | 4/56 | Kaufman et al. | 210—33 X |
| 2,764,512 | 9/56 | Wilson | 210—24 |

MORRIS O. WOLK, *Primary Examiner.*

CARL F. KRAFFT, EARL BERGERT, ALEXANDER WYMAN, CARL D. QUARFORTH, *Examiners.*